US008122053B2

(12) United States Patent
White

(10) Patent No.: US 8,122,053 B2
(45) Date of Patent: Feb. 21, 2012

(54) METHOD OF BIBLIOGRAPHIC FIELD NORMALIZATION

(75) Inventor: Jason M. White, Ottawa (CA)

(73) Assignee: Semiconductor Insights, Inc., Kanata, Ontario (CA)

( * ) Notice: Subject to any disclaimer, the term of this patent is extended or adjusted under 35 U.S.C. 154(b) by 325 days.

(21) Appl. No.: 11/970,195

(22) Filed: Jan. 7, 2008

(65) Prior Publication Data

US 2009/0077066 A1 Mar. 19, 2009

(30) Foreign Application Priority Data

Sep. 13, 2007 (CA) .................................. 2602309

(51) Int. Cl.
*G06F 17/30* (2006.01)
(52) U.S. Cl. ......................................................... 707/780
(58) Field of Classification Search ........................ None
See application file for complete search history.

(56) References Cited

U.S. PATENT DOCUMENTS

| 6,556,991 | B1 | 4/2003 | Borkovsky |
| 7,003,516 | B2 * | 2/2006 | Dehlinger et al. ................ 1/1 |
| 7,076,732 | B2 | 7/2006 | Nagao |
| 2005/0021551 | A1 * | 1/2005 | Silva et al. ................ 707/102 |
| 2007/0179956 | A1 * | 8/2007 | Whitmyer ................ 707/10 |

OTHER PUBLICATIONS

Wikipedia, *Damerau-Levenshtein Distance*, website printed Aug. 29, 2007, http://en.wikipedia.org/wiki/Damerau-Levenshtein_distance.
Fred J. Damerau, *A Technique for Computer Detection and Correction of Spelling Errors*, Communications of the ACM, vol. 7, No. 3, Mar. 1964, pp. 171-176.
Wikipedia, *Hamming Distance*, website printed Aug. 29, 2007, http://en.wikipedia.org/wiki/Hamming_distance.
Wikipedia, *Database Normalization*, website printed Aug. 29, 2007, http://en.wikipedia.org/wiki/Database_normalization.
Wikipedia, *Levenshtein Distance*, website printed Aug. 29, 2007, http://en.wikipedia.org/wiki/Levenshtein_distance.
Manuel Trajtenbert, *The Names Game: Using Inventors' Patent Data in Economic Research*, Tel Aviv University, NBER and CEPR, May 19, 2004, pp. 1-52.

(Continued)

*Primary Examiner* — Belinda Xue
(74) *Attorney, Agent, or Firm* — Workman Nydegger

(57) ABSTRACT

A method of normalizing a bibliographic field of a structured field relational database is disclosed. The method includes weighting potential candidate records according to the value in the corresponding field in the records, together with other related fields in the candidate record and other related records in the database. Each of the candidate records is successively evaluated and compared against an acceptable threshold. If the weight exceeds the threshold, the candidate record is returned from the query. Otherwise, a new entry in the database is created. Optionally, before creating such a new entry, the highest weighted candidate record may be compared against a minimally acceptable threshold and if the weight exceeds such a lower threshold, the candidate is returned from the query.

4 Claims, 4 Drawing Sheets

OTHER PUBLICATIONS

Manuel Trajtenbert et al., *The "Names Game": Harnessing Inventors' Patent Data for Economic Research*, National Bureau of Economic Research Working Paper Series, Cambridge, MA, Aug. 2006, pp. 1-75.

E. F. Codd, *Further Normalization of the Data Base Relational Model*, IBM Research Laboratory, San Jose, California, 1971, pp. 33-64.

V. I. Levenshtein, *Binary Codes Capable of Correcting Deletions, Insertions, and Reversals*, translated from Doklady Akademii Nauk SSSR, vol. 163, No. 4, Aug. 1965, pp. 845-848, article submitted under Soviet Physics—Doklady, vol. 10, No. 8, Feb. 1966, pp. 707-710.

R. W. Hamming, *Error Detecting and Error Correcting Codes*, The Bell System Technical Journal, vol. XXVI, No. 2, Apr. 1950, pp. 147-160.

\* cited by examiner

METHOD OF BIBLIOGRAPHIC FIELD NORMALIZATION

CROSS-REFERENCE TO RELATED APPLICATIONS

This application claims priority to Canada Patent Application No. 2,602,309, filed Sep. 13, 2007, which is incorporated herein by reference.

BACKGROUND OF THE INVENTION

1. The Field of the Invention

The present invention relates to database entry and more particularly to an improved method of bibliographic field normalization of database entries.

2. The Relevant Technology

Many database systems contain many thousands or even millions of records. Typically, one or more fields of such records are predominantly used for cataloguing or searching database records. These fields are known as bibliographic fields.

Not infrequently, a plurality of database records will have a common value for such bibliographic fields. For example, in a database recording details of a plurality of patent records, the name of an individual or a corporation, who may be an inventor and/or assignee of the patent, may be used for accessing the patent database. But, that same individual or corporation's name may be used for several patents having the same inventor and/or assignee name.

Where, as is often the case, record entries are manually entered, it is not unusual to encounter incorrect entries. This is so, even with the establishment of standard naming conventions, such as for individual's names (for example, that the last name be followed by the given name, separated by commas, or that the name be preceded by one of a subset of salutations, e.g., "Mr.", "Ms.").

Moreover, the record data may be correctly entered, but the information on the record itself may represent a latent entry error at an earlier stage, for example, a typographical error in the name of the inventor on the cover page of a granted patent.

Typically, most database entry systems implement a human verification step whereby the verifier manually checks the records entered, or checks for a match between the record fields being entered and corresponding entries already entered in the database. This ensures that the database is maintained in a correct form throughout and thus is suitable for searching.

However implemented, where a record contains even a small number of bibliographic fields, such a human verification process is costly and does not guarantee universal compliance with any naming conventions or 100% accuracy of data entries. Indeed, if the error is latent, that is, incorrectly entered on the document or record now being entered into the database, the verification process will have no impact.

Furthermore, the cost of such a process mandates that such verification typically is only implemented for a small subset of identified key bibliographic fields, for example, in a patent database, the name of the primary inventor and/or the assignee. Other bibliographic fields, such as co-inventor names, agents, or other parties, typically remain unverified and presumably fraught with database entry errors. Thus, to the extent that a search is conducted using such secondary bibliographic fields, the human verification task will not provide any assurances that the correct or desired records will be uncovered by the search.

As a result of the foregoing, there has been interest in developing normalization processes, which, rather than forcing the correctness of database entries, work with potentially incorrect entries and generate metrics for identifying which non-identical bibliographic fields refer to the same entity for purposes of searching the database.

Many of these processes make use of edit distance algorithms, including but not limited to the Levenshtein, Hamming and Damerau-Levenshtein algorithms for quantifying the similarity between two words. Also known as fuzzy searching, such algorithms typically measure the correlation between two text strings by weighting the difference between them, with a zero weight corresponding to identical strings, a weight of one corresponding to strings that differ by a single substitution (the change created by a single letter in a word) and so on.

Using such a metric, the lower the weighting, the more likely that the strings under consideration constitute a match, that is, refer to the same bibliographic entity, which may be identified using a look-up table or dictionary.

There are a number of prior art systems directed to methods to automatically correct textual errors in a query.

For example, U.S. Pat. No. 7,076,732, issued Jul. 11, 2006, to Nagao, and entitled "Document Processing Apparatus Having an Authoring Capability for Describing a Document Structure," describes the use of dictionary looping to correct errors in phrasal strings. Phrasal strings refer to a string of words that do not form a complete sentence, such as key words in a search engine. The method, taught by Nagao, segments the entire phrasal string into substrings, rather than space-delineated words, and compares these substrings against entries in a phrasal dictionary to obtain a best match. Nagao is primarily geared to spelling correction within a search engine and is of limited applicability in normalizing bibliographic fields within a large database.

U.S. Pat. No. 6,556,991, issued Apr. 29, 2003, to Borkovsky and entitled "Item Name Normalization" groups similarly spelled candidate bibliographic fields together to form clusters in a dictionary relating to a selected normalized bibliographic field. A candidate field entered into the database is mapped to the corresponding normalized field for such cluster. Borkovsky limits the matching capabilities to consideration of a dictionary listing only. Thus, weighting of candidate records is based only on the value of the bibliographic field in question.

Trajtenberg et al., in a presentation entitled "The Names Game: Using Inventors Patent Data in Economic Research" at the NBER and CEPR Conference at Tel Aviv University in 2004, online: <www-siepr.stanford.edu/programs/SST_Seminars/Seminar_Stanford_1.ppt>,("Trajtenberg No. 1"), and in a paper entitled "The 'Names Game': Harnessing Investors' Patent Data for Economic Research" National Bureau of Economic Research, Working Paper 12479 (August 2006), online: National Bureau of Economic Research <www.nber.org/papers/w12479>("Trajtenberg No. 2") describe a method to obtain data useful in economic research from patent information and, more specifically, from inventor information. Record fields corresponding to the inventor are normalized during searches by matching a candidate to the query bibliographic field by using a related field, for example, matching patent number and inventor name field pairs. Trajtenberg Nos. 1 and 2, however, use pair-wise matching techniques to match pairs of these related fields, and do not consider more than one related field or any potential related records in the database related to the bibliographic field in question.

It would therefore be advantageous to devise an improved automated bibliographic field normalization approach that minimizes the use of humans to verify the accuracy of the data input of records into the database.

SUMMARY OF THE INVENTION

The present invention seeks to provide an improved bibliographic field normalization approach during a search that optimizes the potential for finding a match to a bibliographic field specified in a query.

Moreover, the present invention seeks to provide an improved bibliographic field normalization approach that distinguishes between multiple identical bibliographic field values and/or similar bibliographic field values within a common database.

According to an embodiment of the present invention, a method of normalizing a potentially error-prone bibliographic field that is the basis for a query of a structured field relational database is disclosed. When a query is being formulated based on a bibliographic field, likely candidates for the bibliographic field are identified, using distances between words, possible abbreviations or other similarities.

The present invention takes advantage of clues contained in related fields that may or may not be specified in the query, but also on the fact that in many relational databases, there may exist a plurality of records that are related to the candidate record through the specified bibliographic field or otherwise.

According to a first broad aspect of an embodiment of the present invention, there is disclosed a method of normalizing a queried field in a structured relational database through a query, wherein the structured relational database has a plurality of records, the method comprising steps of (a) identifying at least one candidate record amongst the plurality of records, whereby the at least one candidate record has a value in a corresponding field that is similar to a value in the queried field; (b) for a selected candidate record of the at least one candidate record, generating a similarity weight reflecting the similarity of the value in the corresponding field to the value in the queried field, having regard to values in other fields of the candidate record; (c) comparing the similarity weight against an acceptable threshold value and if the similarity weight is less than the acceptable threshold value, repeating step (b) with a different selected candidate record until all candidate records of the at least one candidate record have been selected; (d) if the similarity weight is at least equal to the acceptable threshold value, returning the selected candidate record in response to the query; and (e) otherwise, creating a new entry in the database in response to the query.

According to a second broad aspect of an embodiment of the present invention, there is disclosed a computer-readable medium having computer-executable instructions, when executed by a computer, that cause the computer to perform the method of normalizing a queried field in a structured relational database through a query, wherein the structured relational database has a plurality of records, the method comprising steps of: (a) identifying at least one candidate record amongst the plurality of records, whereby the at least one candidate record has a value in a corresponding field that is similar to a value in the queried field; (b) for a selected candidate record of the at least one candidate record, generating a similarity weight reflecting the similarity of the value in the corresponding field to the value in the queried field, having regard to values in other fields of the candidate record; (c) comparing the similarity weight against an acceptable threshold value and if the similarity weight is less than the acceptable threshold value, repeating step (b) with a different selected candidate record until all candidate records of the at least one candidate record have been selected; (d) if the similarity weight is at least equal to the acceptable threshold value, returning the selected candidate record in response to the query; and (e) otherwise, creating a new entry in the database in response to the query.

BRIEF DESCRIPTION OF THE SEVERAL VIEWS OF THE DRAWINGS

The embodiments of the present invention will now be described by reference to the following figures, in which identical reference numerals in different figures indicate identical elements and in which.

DETAILED DESCRIPTION OF THE PREFERRED EMBODIMENTS

The invention will be described for the purposes of illustration only in connection with certain embodiments; however, it is to be understood that other objects and advantages of the present invention will be made apparent by the following description of the drawings according to the present invention. While a preferred embodiment is disclosed, this is not intended to be limiting. Rather, the general principles set forth herein are considered to be merely illustrative of the scope of the present invention and it is to be further understood that numerous changes may be made without straying from the scope of the present invention.

Figure 1:
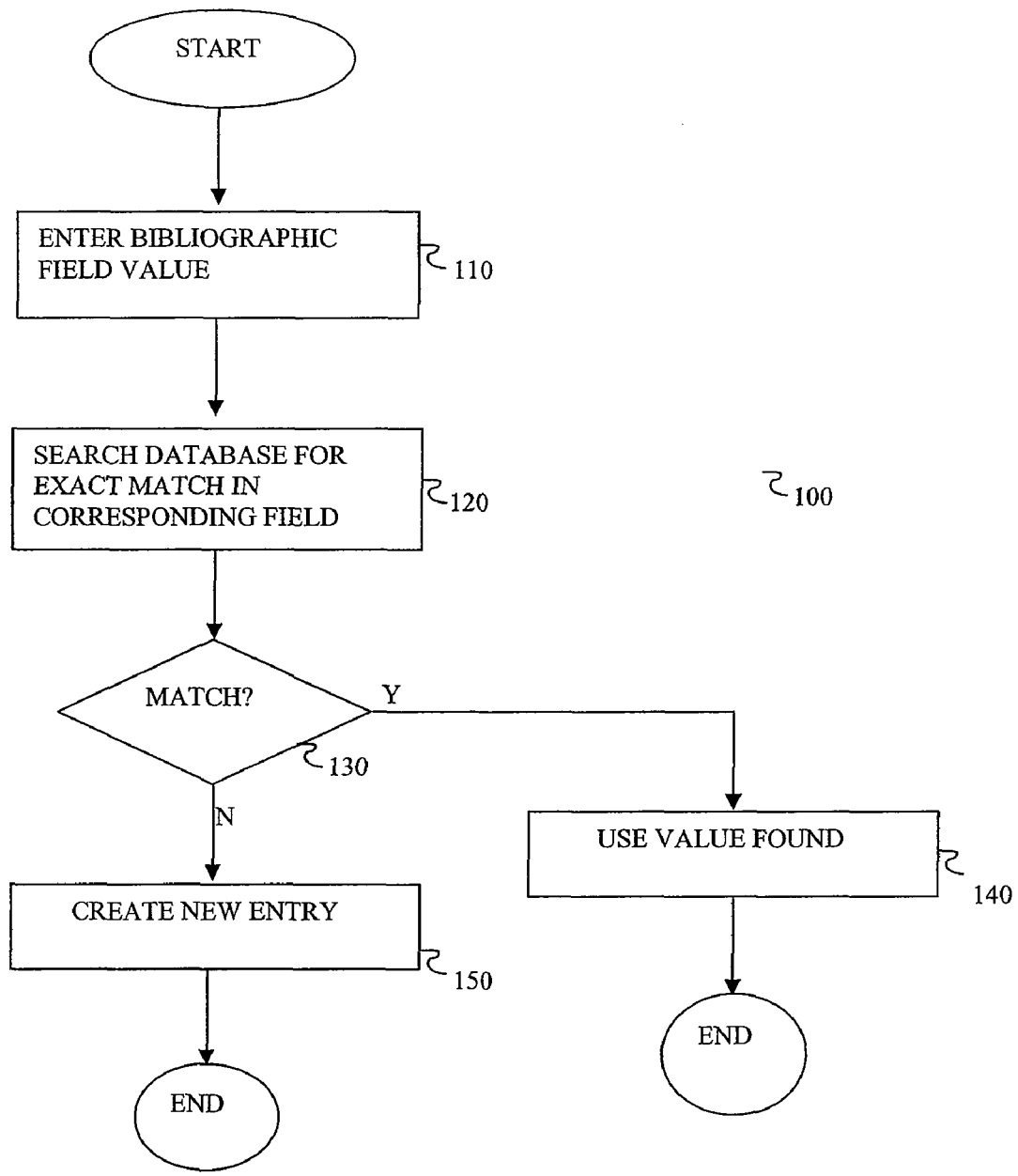
FIG. 1 is a flow chart showing processing steps followed in a first prior art method of bibliographic field normalization.

Referring to FIG. 1, flowchart 100 shows processing steps being followed in a simplistic prior art method of bibliographic field normalization, well known to the skilled artisan as a third normalization form for databases.

According to the flowchart 100, the first step 110 involves entering a value under a bibliographic field to search and retrieve a record from a database. For example, the record could be a patent in a patent database, and the value entered could be the name of the primary inventor, or of an assignee.

Next, step 120 searches the database for records having a corresponding bibliographic field that matches the field value entered. As such, candidate records having a weighted value of zero would represent an exact match for the corresponding bibliographic field.

If an exact match is found at decision step 130, step 140 returns the record with which the corresponding field was matched in response (or in the process of responding) to the query. After step 140, the process ends.

If no match is found at decision step 130, then the field value as entered is added as a unique, new entry to the database 150. After step 150, the process ends.

Figure 2:
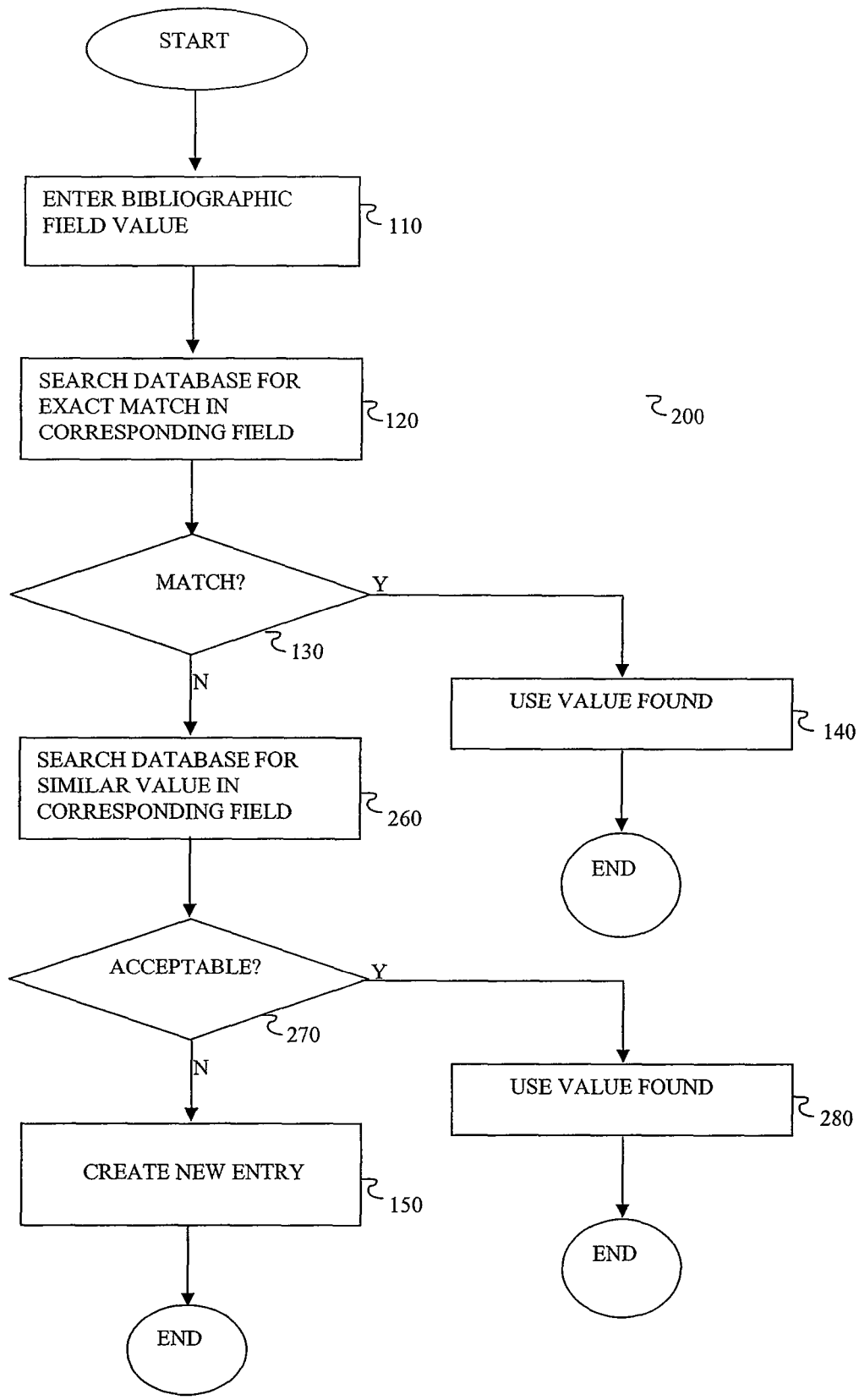
FIG. 2 is a flow chart showing processing steps followed in a second prior art method of bibliographic field normalization.

A slightly more robust prior art method is shown, generally as flowchart 200, in FIG. 2. Flowchart 200 is very similar to flowchart 100 shown in FIG. 1. However according to the process steps shown in flowchart 200, if an exact match is not found at step 130, rather than creating a new entry at this stage, a further inquiry is made at step 260. Step 260 searches the database for candidate records having a corresponding bibliographic field having an inexact match with the field value entered. Candidate records having a weighted value of greater than zero would represent an inexact match for the corresponding bibliographic field.

Next, decision step 270 determines if the inexact match is acceptable based on the weighted value associated with the candidate record. If an acceptable match is found at decision step 270, step 280 returns the record, with which the corresponding field was matched, in response (or in the process of responding) to the query. After step 280, the process ends.

If no acceptable match is found, then the field value as entered is added as a unique entry to the database at step 150. After step 150, the process ends.

In this second example of the prior art, an acceptable match is determined by establishing an appropriate threshold weighted value, below which a match is considered acceptable and above which a match is considered unacceptable. Again, a value of zero indicates an exact match.

In many prior art approaches, a more nuanced approach to weighting is adopted, involving the evaluation of a limited amount of additional data. For example, in a patent database scenario, where the primary bibliographic field is the name of the assignee, the second search step 260 may comprise a search of both this primary bibliographic field and of the corresponding field for the name of the primary inventor. According to this approach, the weighting may be calculated based on the similarity of these two fields to the corresponding entries in the record being added to the database. The consideration of such additional data permits a gradation of weights to be assigned.

Those having ordinary skill in this art will readily appreciate that the likelihood of finding an acceptable match increases with the amount of additional related field data that is considered.

Figure 3:
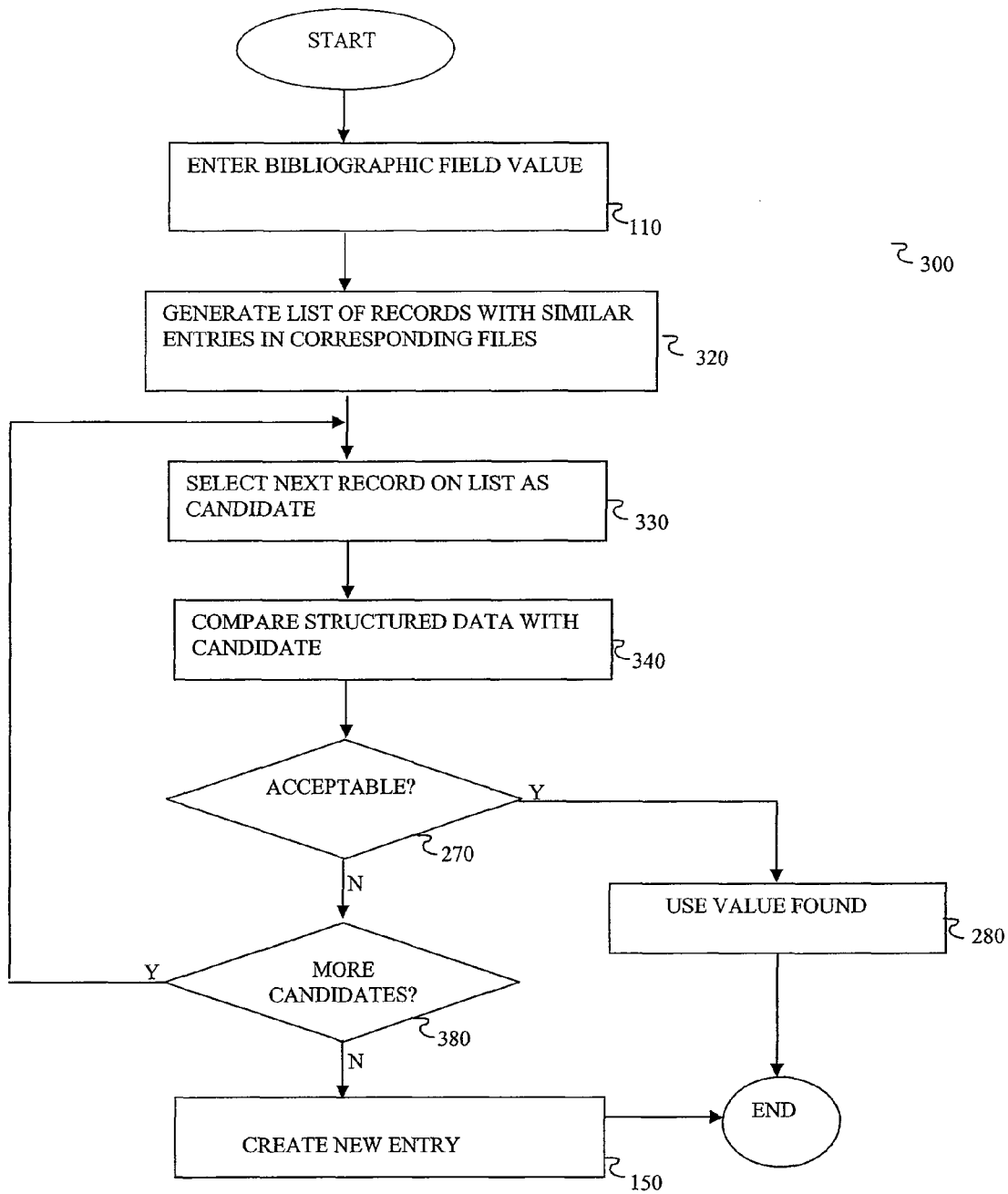
FIG. 3 is a flow chart showing processing steps followed in an exemplary embodiment of the present invention.

Turning now to FIG. 3, there is shown generally a flow chart 300 of processing steps followed in an exemplary embodiment of the present invention. According to these processing steps, step 110 involves entering a value under a bibliographic field to search and retrieve a record from a database. For example, the record could be a patent in a patent database, and the value entered could be the name of the primary inventor.

Next, step 320 searches the database for records having a corresponding bibliographic field that matches the field value entered. More specifically, step 320 searches for candidate records having a weighted value of near zero for the corresponding bibliographic field. Based on the database, step 320 also generates a list of candidate records that have similar values in the corresponding field. The candidate records list is compiled based upon the weighted value assigned with reference to the specified bibliographic field only.

Preferably, an appropriate first threshold weighted value is established, below which a match is considered acceptable and above which a match is considered unacceptable, to limit the number of potential candidates to evaluate. The first threshold value may be pre-defined at the system level. Alternatively, the first threshold value may be dependent upon the nature of the bibliographic field under consideration and/or the type of database in which queries are being made. In any event, some experimentation, in a manner well known in the art, may be called for in order to arrive at a suitable threshold value.

Following step 320, the next candidate record in the candidate list is selected for consideration at step 330. For that selected candidate, the value in the bibliographic field under consideration, together with other structured data, including, but not limited to, the value in the same bibliographic field for all records related to the candidate record, are compared to the correlated values for records related to the original query at step 340.

Other suitable structured data could include other fields in the same candidate (or related) record, bibliographic, non-document related or otherwise.

Still other suitable structured data sets will become apparent to those having ordinary skill in this art.

Such structured data is weighted in a hierarchical manner based on its relevance to the bibliographic field. Such weighting may therefore differ from one bibliographic field to another.

For example, in a patent database, the inventor's address may have a greater relevance to normalizing a text submitted such as the inventor's name in a query, than, for example, the US classification code, or to a lesser extent, the assignee's name. On the other hand, where the bibliographic field is different, say for example, the international classification code, the relative relevance of related fields may well change as well.

Preferably, an appropriate second threshold weighted value is established, below which a match is considered acceptable and above which a match is considered unacceptable.

For each candidate record in the candidate list, step 340 compares the relevant data from the candidate record with the structure data, i.e., the bibliographic field value entered at step 110. Specifically at step 340, the specified field and relevant related fields in the candidate record and also in related records may be evaluated against the query values and a weight is derived therefrom that is measured against the second threshold value.

If an acceptable match is found at decision step 270, step 280 returns, in response to the query (or in the process of responding), the record with which the corresponding field was matched. After step 280, the process ends.

If no acceptable match is found and if more candidate records exist according to decision step 380, they are evaluated in turn beginning at step 330. If no acceptable match is found and if no more candidates exist according to decision step 380, then the field value as entered at step 110 is added as a unique entry to the database at step 150.

Figure 4:
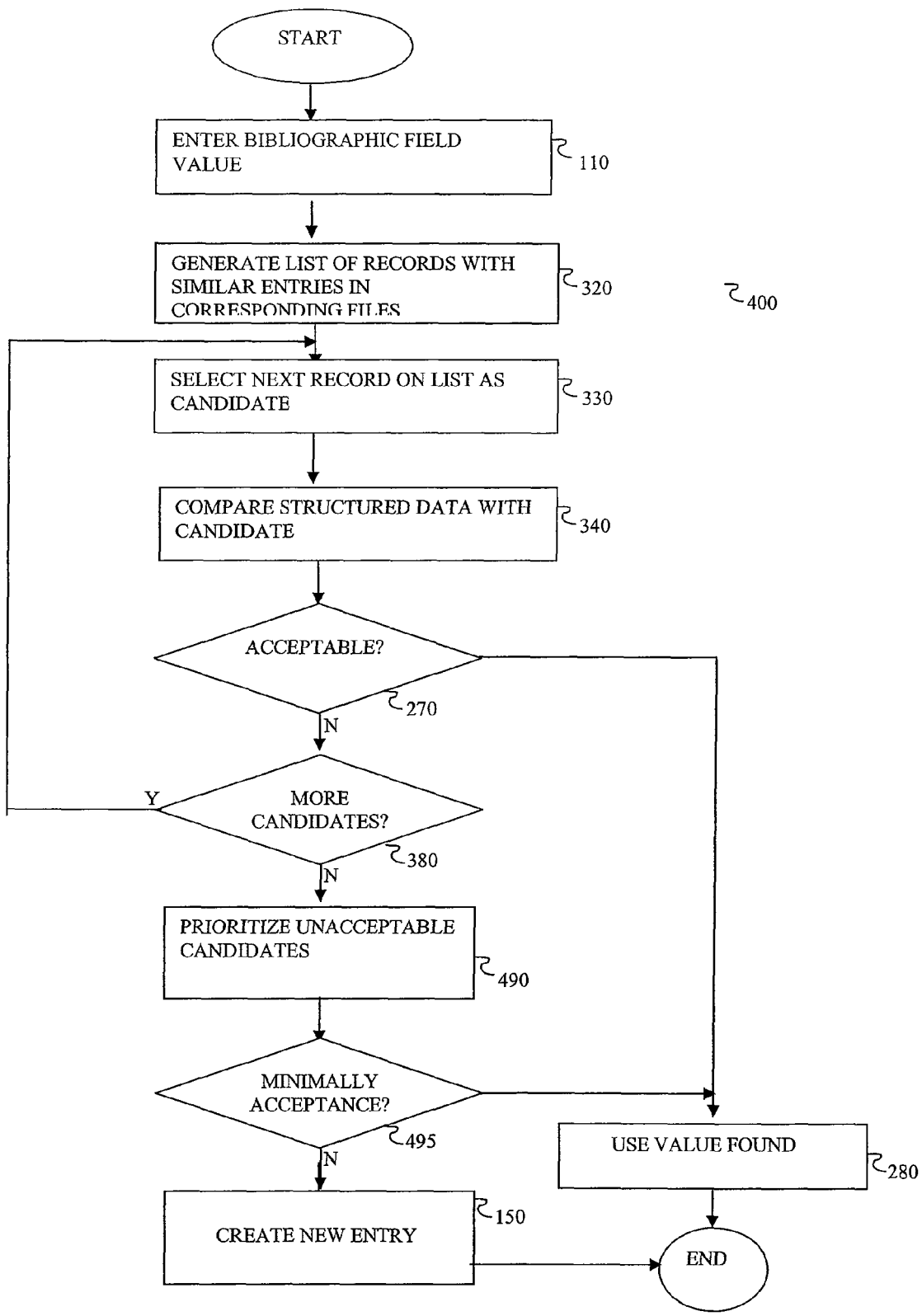
FIG. 4 is a flow chart showing processing steps followed in another exemplary embodiment of the present invention.

Turning now to FIG. 4, a flow chart 400 details processing steps followed in a second exemplary embodiment of the present invention.

This flowchart 400 is similar, at least in initial steps 110, 320, 330, 340, 270 and 380, to flowchart 300 shown in FIG. 3.

However, after determining that no more candidates exist, prior to entering the field value as entered in the query as a unique entry to the database at step 150, a couple of additional processing steps occur.

First, step 490 prioritizes, according to weight, each of the previously considered candidates that have been deemed unacceptable.

Second, according to step 495, the weight assigned to the highest weighted candidate is compared against a third threshold weighted value that is less than the second threshold weighted value but more than the first threshold weighted value. This third threshold value comprises a minimally acceptable value, which represents a value that is the least satisfactory match, but one that would be acceptable having regard to the fact that no wholly satisfactory match has been uncovered.

The three threshold values may be understood as follows. The first threshold value is a minimal value designed only to cut off the list of candidates from being overly long. The second threshold value is one that will identify those candidates that are easily identifiable as a match. The third threshold value is one that will identify those candidates that are a probable match and where comparison and prioritization among other candidate possibilities is advisable.

It is only where the highest weighted candidate does not exceed the third threshold value, at step 495, that the field value as entered in the query is entered as a unique entry to the database at step 150.

The methods detailed in flowcharts 300 or 400 may also be applied in iterative fashion, to obtain other acceptable candidates, with a progressively decreasing number of candidates being considered with each iteration, to thus unify additional records. For example, methods 300 and 400 may determine that "John Doe" and "John M. Doe" are in fact the same person, and thus unify their respective record. Thus, on a further iteration, it may be determined based on the now unified record that company "ABC" and "ABCD" are the same company based, in part, on the now unified record of "John Doe" and "John M. Doe." Thus, the application of the methods may, with each iteration, further normalize the database.

The following example may also serve to illustrate specific embodiments of the invention. Table 1 below details five patent records, P1, P2, P3, P4, P5.

assignees A1 and A2 are in fact the same entity. However, further bibliographic field values may also be considered.

According to Table 1, P3 is a continuation of P1, i.e., the P3 patent application was filed as a continuation application based on the P1 original application. As a general rule, the same assignee would file the original and continuation applications. Thus, this relationship is another very strong indicator that there is a match between A1 and A2.

In addition, P1 and P2 share three out of four inventors with P3, P4, and P5. Again, this is another very strong indicator that there is a match between A1 and A2.

Moreover, because patentees will often cite their own patents as prior art or background, the fact that P2 cites P4, and that P5 cites P1 and P2, is a good indicator that there is a match between A1 and A2.

Finally, because all of the patents share the same patent agent B1, this is another good indicator of a match between A1 and A2. However, use of the same patent agent is not in and of itself a strong indicator. Rather, this factor taken in combination with the other favourable factors becomes a good indicator.

Given the strong indicators, the method reconciles entry A1 and A2 into a single entry, A2. The reconciliation normalizes the database.

TABLE 1

| | Patent Record | | | | |
|---|---|---|---|---|---|
| | P1 | P2 | P3 | P4 | P5 |
| Assignee | Semi-Conductor Insights (A1) | Semi-Conductor Insights (A1) | Semiconductor Insights, Inc. (A2) | Semiconductor Insights, Inc. (A2) | Semiconductor Insights, Inc. (A2) |
| Assignee Address | 3000 Solandt Road, Ottawa ON K2K 2X2 | 3000 Solandt Road, Ottawa ON K2K 2X2 | 3000 Solandt Rd. Kanata ON K2K 2X2 | 3000 Solandt Rd. Kanata ON K2K 2X2 | 3000 Solandt Rd. Kanata ON K2K 2X2 |
| Inventor | Jason White (I1), Vyacheslav Zavadsky (I2) | Jason White (I1), Linda Wallace (I3), Slava Zavadsky (I4) | Vyacheslav Zavadsky (I2), Jason Abt (I5) | Vyacheslav Zavadsky (I2), Linda Wallace (I3) | Jason White (I1), Jason Abt (I5), Linda Wallace (I3) |
| Family Member | Original application for P3 | Cites P4 | Continuation application of P1 | None | Cites P1 and P2 |
| Patent Agent | B1 | B1 | B1 | B1 | B1 |

According to the example illustrated in Table 1, the bibliographic field to be matched is the assignee value listed above as Semi-Conductor Insights (A1). One potential candidate match is the assignee value listed above as Semiconductor Insights, Inc. (A2). The edit distance between A1 and A2 is 3: one edit for deletion of '–', one edit for substitution of 'c' for 'C', one edit for insertion of common phrase ', Inc.'. The entered length for A1 is 23. Therefore, the edit distance to length of value can be expressed as a ratio of 3/23, which equals 13%. According to this example, the ratio of 3/23 is an acceptable ratio of similarity to proceed with determining whether A1 and A2 are in fact a match.

According to an embodiment of the present invention, the method will search all patent records associated with 'Semi-Conductor Insights'. Here, two records are found: P1, P2.

Next, according to the same embodiment, the method searches all patent records associated with 'Semiconductor Insights, Inc.' There are three records found: P3, P4, P5.

Because assignees A1 and A2, for respective patent records P1, P2, P3, P4, P5, share a very similar address, the edit distance ratio of 3/23 suggests that these assignee addresses are possibly the same. Furthermore, the identical addresses for assignees A1 and A2 is also a very strong indicator that It should also be mentioned that, in a further iteration of the method, the inventor name 'Vyacheslav Zavadksy' may be matched with 'Slava Zavadsky', thus reconciling values 12 and 14 to a single entry, 12. This, in turn, may lead to additional matches in the database, and so on, in a diminishing manner until no further additional matches can be made.

The present invention can be implemented in digital electronic circuitry, or in computer hardware, firmware, software, or in combination thereof. The invention can be implemented in a computer program product tangibly embodied in a machine-readable storage device for execution by a programmable processor; and process steps can be performed by a programmable processor executing a program of instructions to perform functions of the invention by operating on input data and generating output. The invention can be implemented advantageously in one or more computer programs that are executable on a programmable system including at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and specific microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; CD-ROM disks; and buffer circuits such as latches and/or flip flops. Any of the foregoing can be supplemented by, or incorporated in ASICs (application-specific integrated circuits), FPGAs (field-programmable gate arrays) or DSPs (digital signal processors).

Types of computers that are suitable for implementing or performing the methods of the invention may comprise a processor, a random access memory, a hard drive controller, and an input/output controller coupled by a processor bus.

It will be apparent to those skilled in this art that various modifications and variations may be made to the embodiments disclosed herein, consistent with the present invention, without departing from the spirit and scope of the present invention. Other embodiments consistent with the present invention will become apparent from consideration of the specification and the practice of the invention disclosed therein.

Accordingly, the specification and the embodiments are to be considered exemplary only, with a true scope and spirit of the invention being disclosed by the following claims.

What is claimed is:

1. A method of normalizing a queried field in a structured relational database using a first threshold value, a second threshold value and a third threshold value, the method comprising steps of:
   (a) in response to a query of a bibliographic field in a structured relational database, the query including a query value, identifying one or more candidate records in the structured relational database, in which each of the one or more candidate records has a value in a corresponding bibliographic field that is similar to the query value based on the first threshold value;
   (b) selecting a candidate record from the one or more candidate records;
   (c) for the selected candidate record, generating a similarity weight reflecting the similarity of the value in the corresponding bibliographic field to the query value, the similarity weight being based on the value in the corresponding bibliographic field of the selected candidate record in conjunction with values in the corresponding bibliographic field of each of other of the one or more candidate records in relation to values in related fields of the selected candidate record and related fields in records related to the selected candidate record;
   (d) if the similarity weight of the selected candidate record is less than the second threshold value and if there remain candidate records that have not been selected from the one or more candidate records: selecting one of the candidate records that have not been selected, and repeating steps (c) and (d);
   (e) else if the similarity weight of the selected candidate record is greater than or equal to the second threshold value:
      returning the selected candidate record in response to the query,
      storing the value of the corresponding bibliographic field of the selected candidate record into an existing entry in the database, and
      reconciling the value of the corresponding bibliographic field of each of the one or more candidate records to use the value of the corresponding bibliographic field of the selected candidate record;
   (f) else: prioritizing the one or more candidate records based on the similarity weight of each candidate record, and
      if the similarity weight of the highest priority candidate record is greater than or equal to the third threshold value:
         returning the highest priority candidate record in response to the query,
         storing the value of the corresponding bibliographic field of the highest priority candidate record into an existing entry in the database, and
         reconciling the value of the corresponding bibliographic field of each of the one or more candidate records to use the value of
      the corresponding bibliographic field of the highest priority candidate record, else: creating a new entry in the database in response to the query, the query value being stored in the new entry.

2. The method as defined in claim 1, wherein the database contains patent records.

3. A computer-readable storage medium having computer-executable instructions that, when executed by a computer, cause the computer to perform a method of normalizing a queried field in a structured relational database using a first threshold value, a second threshold value and a third threshold value, the method comprising steps of:
   (a) in response to a query of a bibliographic field in a structured relational database, the query including a query value, identifying one or more candidate records in the structured relational database, in which each of the one or more candidate records has a value in a corresponding bibliographic field that is similar to the query value based on the first threshold value;
   (b) selecting a candidate record from the at one or more candidate records;
   (c) for the selected candidate record, generating a similarity weight reflecting the similarity of the value in the corresponding bibliographic field to the query value, the similarity weight being based on the value in the corresponding bibliographic field of the selected candidate record in conjunction with values in the corresponding bibliographic field of each of other of the one or more candidate records in relation to values in related fields of the selected candidate record and related fields in records related to the selected candidate record;
   (d) if the similarity weight is less than the second threshold value and if there remain candidate records that have not been selected from the one or more candidate records: selecting one of the candidate records that have not been selected, and repeating steps (c) and (d);
   (e) else if the similarity weight of the selected candidate record is greater than or equal to the second threshold value:
      returning the selected candidate record in response to the query,
      storing the value of the corresponding bibliographic field of the selected candidate record into an existing entry in the database, and
      reconciling the value of the corresponding bibliographic field of each of the one or more candidate records to use the value of the corresponding bibliographic field of the selected candidate record;

(f) else: prioritizing the one or more candidate records based on the similarity weight of each candidate record, and
if the similarity weight of the highest priority candidate record is greater than or equal to the third threshold value:
returning the highest priority candidate record in response to the query,
storing the value of the corresponding bibliographic field of the highest priority candidate record into an existing entry in the database, and
reconciling the value of the corresponding bibliographic field of each of the one or more candidate records to use the value of the corresponding bibliographic field of the highest priority candidate record, else, creating a new entry in the database in response to the query, the query value being stored in the new entry.

4. The computer-readable storage medium as defined in claim 3, wherein the database contains patent records.

* * * * *